Figure 1:
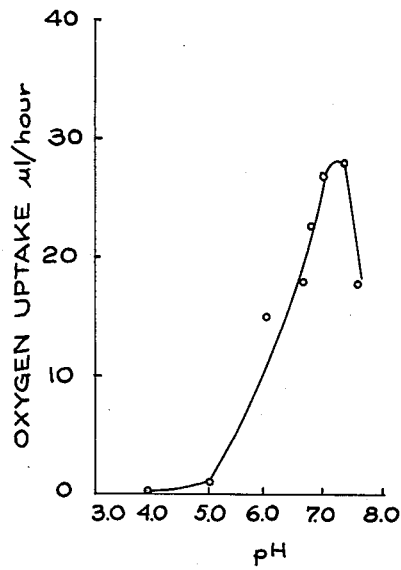

INVENTOR.
JOHN A. D. COOPER
ATTORNEYS 3,005,714
GALACTOSE OXIDASE
John A. D. Cooper, Evanston, Ill., assignor to Northwestern University, Evanston, Ill., a corporation of Illinois
Filed Aug. 26, 1959, Ser. No. 836,110
13 Claims. (Cl. 99—54)

The instant invention relates to the preparation and use of a novel enzyme. More particularly, it relates to the preparation and some specific uses for a novel galactose oxidase of high specificity.

The principal substrate of glucose oxidase is glucose; however, due to an apparent lack of specificity, glucose oxidase also oxidizes galactose, but at a very slow rate. Because of this lack of specificity, glucose oxidase is unsuitable for the detection or estimation of galactose in media which might also contain glucose. And because of its slow rate of action, glucose oxidase is of little or no value for the elimination of galactose from special dietary foods and other commercial products, or for the manufacture of galactonic acid and other products from galactose.

Prior to the instant discovery, no enzyme was known which was capable in the presence of oxygen of oxidizing galactose as the main substrate, to galactonic acid. A galactose oxidase which is incapable of oxidizing glucose would have substantial importance and commercial value.

It is, therefore, an object of the instant invention to provide a new galactose oxidase of high specificity.

It is a further object of the instant invention to provide methods for obtaining galactose oxidase.

It is a further object of the instant invention to provide means for testing for galactosemia by the presence of galactose in the urine.

It is a further object of the instant invention to provide a method for removing galactose from foodstuffs and other substances through the use of galactose oxidase.

It is a further object of the invention to provide a method for quantitative estimation of galactose in substances containing it.

It is a further object of the instant invention to provide a method for producing galactonic acid from galactose.

These and other objects of the instant invention will become more apparent from the following description and claims.

I have prepared a novel enzyme from the mold *Polyporus circinatus* Fr. This enzyme oxidizes galactose in the presence of oxygen. It has a high degree of specificity for galactose, and therefore to conform with the nomenclature adopted for enzymes which act on other sugars and related substrates, it is named galactose oxidase.

Galactose oxidase can be used for the quantitative determination of galactose in substances even in the presence of glucose. Techniques used are manometric and spectrophotometric. In the latter, dyes are oxidized by the hydrogen peroxide formed in a system containing galactose, galactose oxidase, and peroxidase.

The galactose oxidase can also be used for the removal of galactose from substances and for the qualitative detection of galactose. For example, galactosemia can be detected and diagnosed by the presence of galactose in the urine.

In preparing the enzyme, cultures of *Polyporus circinatus* Fr. are grown at room temperature in a liquid mineral medium containing galactose as herein described. The medium is harvested by filtration, dialyzed, for example, against distilled water or sodium phosphate buffer at pH 6.8, and concentrated. The dialyzed medium contains between about 0.1 and about 0.5 mg. of protein per milliliter. The enzyme can be further concentrated and purified to obtain a product of higher activity.

The crude enzyme or the purified preparations can be stored for months in the frozen state without loss of activity.

The enzyme has maximum activity when used at pH's between about 7 and about 7.3, although it has some activity at pH's between about 6.5 and about 7.5. It becomes relatively inactive below pH 5.

In Table I below are shown the various sugars and sugar derivatives that have been used for determining the specificity of the enzyme using the manometric technique and measuring the amount of oxygen taken up when the enzyme oxidizes the sugar.

TABLE I

| Substrate: | $O_2$ uptake, $\mu$l./hour |
|---|---|
| Galactose | 286 |
| Glucose | 0 |
| Mannose | 0 |
| Fructose | 0 |
| Arabinose | 4 |
| Xylose | 3 |
| Sucrose | 0 |
| Galactonolactone | 0 |
| Galacturonic acid | 10 |
| Galactosamine | 6 |

In each determination, the system contained: 2 ml. enzyme preparation; catalase; 0.02 M sodium phosphate buffer, pH 6.8; and 1 mM sugar.

An enzyme is known as an oxidase if it catalyzes the reaction between molecular or free oxygen and some specific substance. The specific substance, the oxidation of which is catalyzed by the oxidase, is known as a substrate for the oxidase. Catalase is an enzyme which causes the breakdown of any hydrogen peroxide formed in the reaction with the oxidase. From Table I, it is observed that the instant enzyme is not an oxidase for the commonly occurring sugars, glucose and mannose, and that it is highly specific for galactose. The reactions involving galactose are believed to be as follows, G representing the substrate being oxidized:

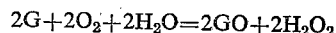
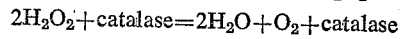

$$2G + 2O_2 + 2H_2O = 2GO + 2H_2O_2$$

$$2H_2O_2 + \text{catalase} = 2H_2O + O_2 + \text{catalase}$$

The presence of galactose in a solution can be determined by testing with a mixture containing galactose oxidase, peroxidase, and a compound which is oxidized by hydrogen peroxide to form a colored compound or to change color. The instant enzyme is highly specific for galactose and can be used to test for the presence of galactose in urine, the presence of which is an indication of galactosemia.

There are a wide variety of compounds in the body which contain galactose. The instant enzyme can be used to determine the amount of galactose in them with a high sensitivity and specificity. The instant enzyme can also be used to measure the amount of galactose in the blood serum or plasma. The rate of disappearance of injected galactose as indicated by the changing blood serum or plasma levels estimated by use of the instant enzymes is related to the state of physiological function of the liver and thus can serve as a liver function test.

The instant oxidase can also be used to remove galactose or oxygen from substances.

In some products, such as foods and drugs, free oxygen in solution is responsible for an objectionable action taking place. On the other hand, there are frequently no objectionable effects if other substances, such as galactose, are present which can be oxidized to use the limited amount of oxygen present. Free oxygen can be removed from a food containing galactose by adding galactose oxidase and catalase to the food, and maintaining said food at a temperature between about room temperature and about 60° C. until the oxygen is consumed. If galactose is not present in the food, a small amount can be introduced with the oxidase and catalase.

On the other hand, some people cannot digest galactose, which is naturally present in many foods, including milk. This condition is known as galactosemia.

When it is desirable to remove galactose from food, such as milk, this can be accomplished by the combination of galactose oxidase, catalase, and free oxygen as described above. Lactose, a disaccharide present in milk contains galactose.

A conventional enzyme which splits lactose can be added to the milk, and the galactose which is formed can then be oxidized to galactonic acid with galactose oxidase in the presence of oxygen.

The enzymes used may be introduced alone or together with other ingredients that are added to various products. For example, in canning processes for vegetables, the galactose oxidase and catalase, which destroys hydrogen peroxide, can be pelletized with salt or mixed with other condiments or flavoring ingredients.

By use of the instant novel enzyme, galactonic acid can be produced. Galactose in the presence of galactose oxidase and free oxygen is oxidized to produce $\alpha$-galactonolactone which is easily converted to galactonic acid.

The preferred methods of carrying out the invention and a number of examples of the application of the present invention to different products are given below. However, modifications and other applications will be apparent to those skilled in the art, and there is no intention of limiting the invention to the following.

*Example 1*

Stock culture of the mold *Polyporus circinatus* Fr. was maintained in agar slants. A medium was prepared by dissolving 25 gms. of bacto agar in one liter hot water, dispensing 10 ml. into 18 mm. x 150 mm. culture tubes and inserting cotton plugs into the tubes, which were sterilized in an autoclave at 10 lbs./sq. in. for 15 minutes. After the tubes had cooled, the bacto agar slants were inoculated by embedding a small particle of mold in the agar using sterile technique. The mold must be transferred to fresh slants every two weeks.

A production medium consisting of two liters of water containing the following constituents was prepared:

| | |
|---|---|
| Galactose | gms__ 30 |
| Monobasic potassium phosphate | gms__ 32.6 |
| Dibasic sodium phosphate | gms__ 3.2 |
| Ammonium sulfate | gms__ 4 |
| Ammonium nitrate | gms__ 2 |
| Magnesium sulfate | gm__ 1 |
| Potassium chloride | gms__ 3 |
| Sodium chloride | gm__ 1 |
| Calcium chloride | gm__ 0.2 |
| Sodium molybdate | mg__ 1.7 |
| Cuprous chloride | mg__ 0.3 |
| Ferric nitrate | mg__ 3.6 |
| Zinc sulfate | mg__ 1.7 |
| Manganese sulfate | mg__ 1.3 |

The pH of the solution of the above ingredients was adjusted to 6.8 before sterilization. After the salts and the galactose were in solution, 250 ml. portions were dispensed into one liter Erlenmeyer flasks, which were plugged with cotton and sterilized in a steam autoclave for 15 minutes at 10 lbs./sq. in. pressure. The flasks were allowed to cool to room temperature before use.

After a stock culture of mold had grown for one week at room temperature, the growth was transferred to a flask of production medium, using sterile precautions. The inoculated medium was allowed to stand one week. The mold grew as a surface pad and was also distributed throughout the medium. Ten milliliters of this resulting seed culture was used to inoculate flasks containing production media.

The inoculated flasks were stored one day at room temperature to permit growth to start. Then the flasks were placed on a rotary shaker operating at 200 r.p.m., and incubation was continued between four and five days. The appearance of the galactose oxidase in the medium was followed quantitatively using a manometric technique, and the contents of each flask were filtered when it showed sufficient activity.

In order to determine the activity, a sample of medium was removed with a sterile pipette and was filtered to remove the mycelia of the mold. The pH of the filtered media was then adjusted to 7 with 0.1 N sodium hydroxide. The usual technique for measuring oxygen uptake as described in "Manometric Techniques," by Umbreit, Burris, and stauffer, Burgess Publishing Company, Minneapolis, Minnesota, was used.

The system used was as follows: in a Warburg flask containing 2 ml. filtered medium, 0.1 ml. catalase diluted 1:5 with water, 0.1 ml. flavin mononucleotide (hereinafter designated as FMN), and 0.3 ml. of 0.2 M sodium phosphate buffer; center well containing 0.2 ml. of 40% aqueous potassium hydroxide; and in the side arm 0.5 ml. of D (+) galactose (360 mg./ml.).

After the conventional Warburg flasks were attached to the manometer, they were placed on a shaker with water bath at 37° C. and allowed to equilibrate for 10 minutes with open manometer stopcocks. The stopcocks were then closed and galactose substrate quickly introduced into the main compartment of the flask from the side arm. After replacing on the shaker, oxygen uptake was followed by the change in pressure in the system as indicated by the manometer readings.

The number of microliters of oxygen taken up per hour by the system was calculated in the usual manner. Active preparations gave between about 200 and about 300 microliters or more per hour of oxygen uptake. At this level of activity, the medium is ready for harvest.

After the inoculated production medium had been filtered, it was placed in bags made from cellophane dialysis tubing and dialyzed overnight in a cold room against 500 ml. of 0.001 M sodium phosphate buffer at pH 7.5. The buffer was then replaced with fresh buffer, and dialysis was continued for between 12 and 24 hours.

The enzyme was removed from the cellophane bags and clarified by centrifuging.

The galactose oxidase can be further purified by passage through a column containing N,N-diethylaminoethyl cellulose (hereinafter designated as DEAE). A thick slurry of 5 gms. of DEAE in 0.001 M sodium phosphate buffer of pH 7.5 was placed in a chromatographic tube and was washed by passing 0.001 M phosphate buffer at pH 7.5 through the column until the pH of the effluent was 7.5.

The dialyzed, centrifuged medium whose pH had been adjusted to 7.5 with dilute sodium hydroxide was passed through the column, collected, and then dialyzed against distilled water.

The amount of protein in the purified solution was usually 0.05 to 0.01 mg./ml., and the purified enzyme solution was usually about twice as active as the dialyzed medium.

Water was removed from the solution by lyophilization, and the white powder that remained contained the enzyme. It can be stored in a tightly stoppered container at —5° C. for many months without appreciable loss of activity.

The following tests were made to determine the properties of galactose oxidase.

TEST A

The relationship between enzyme activity and pH of the environment was determined and is shown in FIGURE 1. The system at 26° C. contained 1 ml. of enzyme preparation, obtained as described above; 0.1 ml.

of catalase; 1.2 ml. of 0.2 M sodium phosphate buffer; 0.5 ml. of 0.2 M galactose; and 0.2 ml. of $1.5 \times 10^{-2}$ M FMN.

The pH of the reaction mixture was measured with a glass electrode. The enzyme appeared to be inactive at pH's below 5 and to have maximum activity at pH 7 to 7.3. Well-dialyzed enzyme preparations exhibited the same activity in maleate buffer as in phosphate buffer at the same pH.

TEST B

The effect of galactose concentration on enzyme activity was determined in a system containing 2 ml. of enzyme preparation; 0.1 ml. of catalase; 0.3 ml. of 0.5 M phosphate buffer, pH 6.9; 0.1 ml. of $1.5 \times 10^{-2}$ M FMN; and 0.5 ml. of galactose solution.

Figure 2:
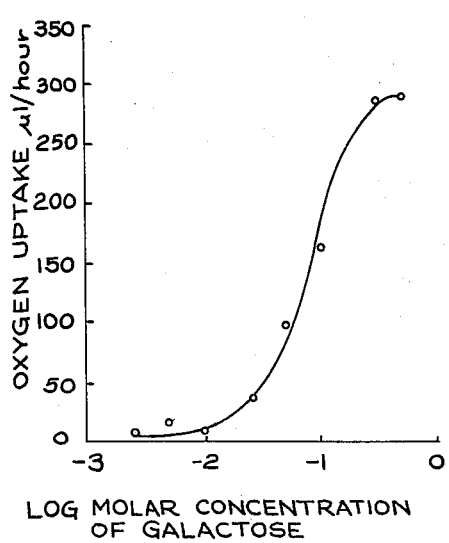

The galactose concentration was varied from 0.0025 to 0.33 M. The results are given in FIGURE 2 in which the number of ml. of $O_2$ taken up per hour is related to substrate concentration.

TEST C

Figure 3:
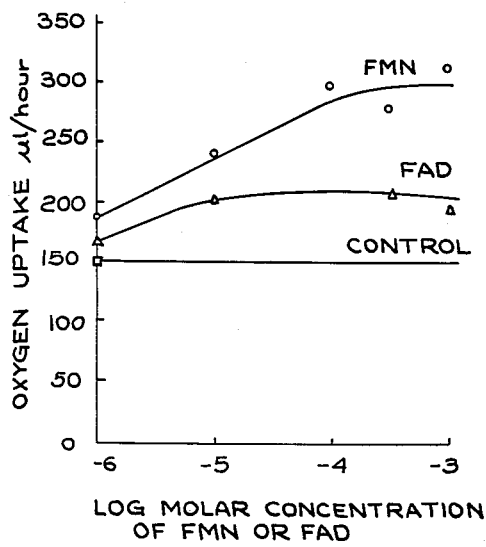

The effect of the addition of FMN and flavin adenine dinucleotide (hereinafter designated as FAD) on the activity of samples of the instant enzyme preparation, which had been exhaustively dialyzed against distilled water at 5° C. was determined. The results are shown in FIGURE 3. This data would indicate that FMN is the prosthetic group of the enzyme and that the presence of a small amount of FMN increases the activity of the instant galactose oxidase enzyme. The FAD is less effective in increasing the activity of the enzyme.

TEST D

The effect of the addition of various cations on the activity of a well-dialyzed preparation of the instant enzyme was determined. The system contained 2 ml. of well-dialyzed enzyme preparation; catalase; and 0.1 M sodium phosphate buffer, pH 7; and $1 \times 10^{-3}$ M FMN.

Table II below shows that only zinc had a stimulating effect.

TABLE II

| Additive | Concentration of Additive | Enzyme Activity, μl of $O_2$ per hour |
| --- | --- | --- |
| None | 0 | 240 |
| Zinc acetate | $1 \times 10^{-3}$ | 320 |
| Do | $1 \times 10^{-4}$ | 300 |
| Do | $1 \times 10^{-5}$ | 280 |
| Do | $1 \times 10^{-6}$ | 280 |
| Magnesium sulfate | $1 \times 10^{-3}$ | 206 |
| Manganese sulfate | $1 \times 10^{-3}$ | 188 |
| Copper sulfate | $1 \times 10^{-3}$ | 94 |
| Cobaltous chloride | $1 \times 10^{-3}$ | 216 |
| Ferric chloride | $1 \times 10^{-3}$ | 196 |

Example 2

Paper strips impregnated with a composition containing galactose oxidase can be used for determining the presence of galactose in fluids.

A solution of 3 mg. horseradish peroxidase per 10 ml. water was prepared. To 1 ml. of this peroxidase solution was added 35 mg. of galactose oxidase and 2 ml. of an o-tolidine solution. The tolidine solution was prepared by dissolving 370 mg. o-tolidine in 16.6 ml. of 95 ethanol, adding 9.5 ml. water, and adjusting the pH of the resulting solution to 4.6 with 4 N formic acid. This solution was diluted to 28.5 ml. with water.

Test papers were prepared by cutting filter paper, such as Whatman 3M filter paper, or the like into small test strips. The end of the strip was dipped into the solution containing the galactose oxidase, peroxidase, and o-tolidine, and allowed to dry in air. The treated strips had a light yellow color.

Strips prepared as described above were used in testing for galactose in prepared aqueous solutions of the following concentrations of galactose: 1%, 0.5%, 0.1%, 0.05%, 0.01%, 0.005%, 0.0025%, and 0.001%.

A test strip was dipped into a few milliliters of each of these galactose-containing solutions. Upon contact with the solutions in which the galactose concentration was between 0.0025% and 1%, the strip immediately turned blue. The strip which had been dipped in the 0.001% galactose solution gradually turned blue over a period of five minutes. The strips are thus useful for immediately detecting galactose at a concentration of 0.0025% or higher, but can be used with even more dilute solutions if a longer period of time for color development is allowed.

The above described test strips are of great usefulness in detecting galactose in the urine and other body fluids. They are sufficiently sensitive to detect galatose in the urine of pregnant women, lactating women, and patients with galactosemia. The use of these test strips will be important in differentiating galactose from glucose in the urine, and thus avoiding a mistaken impression of glucosuria. They also are useful in screening for patients with galactosemia and other disorders of galactose metabolism.

There are many compounds known in the art which change or lose color when oxidized with hydrogen peroxide and which can be used for impregnating these papers or sticks. Suitable compounds include o-tolidine, mesidine, o-dianisidine, and the like.

Example 3

The amount of galactose in a solution was quantitatively determined by measuring the color density of a galactose-containing solution to which peroxidase, enzyme preparation, and a color-forming compound had been added. The color-forming compound can be any one of many known in the art which are oxidized to a colored compound by the hydrogen peroxide formed in the system.

The following solutions were prepared: 1 mg. D (+) galactose per ml. of water; 10 mg. o-dianisidine per ml. methanol, diluted to 100 ml. with 0.01 M sodium phosphate buffer of pH 7; 5 mg. horseradish peroxidase dissolved in 5 ml. of 0.01 M sodium phosphate buffer of pH 7; 10 mg. of purified galactose oxidase powder dissolved in 5 ml. of water, and a 6 molar hydrochloric acid solution. All of these solutions were used at room temperature.

A standard curve was prepared by using samples containing known amounts of galactose. To each of three 18 mm. x 150 mm. test tubes the following amounts of reagents were added: 5 ml. o-dianisidine and 0.3 ml. horseradish peroxidase. Then 0.05, 0.1, and 0.5 ml. of galactose was added respectively to the tubes, and the volume made up to 8 ml. with distilled water. Two milliliters of the unknown solution containing galactose was added to a test tube along with 5 ml. of o-dianisidine, 0.3 ml. horseradish peroxidase, and 0.7 ml. of distilled water.

The four test tubes were placed in a rack in a constant temperature water bath at 37° C. After reaching the bath temperature, 1 ml. of galactose oxidase solution was added to each tube at an interval of 30 seconds. The content of each tube was incubated for 45 minutes, and then the reaction was stopped by adding six drops of 6 M hydrochloric acid to each tube. After mixing and then standing for five minutes, the tubes were removed from the water bath, and the optical density of the color developed was determined using 1 cm. silica cells in a spectrophotometer at a wave length of 400 mμ. A tube of distilled water was used for the zero density setting.

The color density of the samples containing known amounts of galactose were linearly related to concentration and are given below in Table III.

TABLE III

| Micrograms galactose: | Density at 400 mµ |
|---|---|
| 50 | .194 |
| 100 | .396 |
| 500 | 2.060 |

From a graph prepared from this data, the amount of galactose in the unknown solution was found from its color density at 400 mµ.

For estimation of galactose in blood plasma or serum, a protein-free filtrate is prepared as follows: to 1 ml. of blood plasma or serum is added 2 ml. of 5% zinc sulfate, and the resulting mixture is mixed well. Then 2 ml. of 0.3 N barium hydroxide are slowly added, and the resulting mixture allowed to stand for 15 minues before filtering. The clear filtrate (2 ml.) is used for the quantitative estimation of galactose as described above. From the color density, the amount of galactose in the original plasma or serum can be calculated.

The above procedure can be used to prepare colorless, protein-free filtrates of solutions of other galactose-containing substances prior to the quantitative estimation of the galactose therein.

Example 4

Galactonic acid was produced by incubating a galactose-containing solution with galactose oxidase in the presence of molecular oxygen. The solution contained sufficient phosphate buffer to maintain a pH of about 6.8, and the temperature was maintained at 26° C. After the reaction had proceeded to substantial completion, the pH of the reaction mixture was adjusted to 8; and the mixture was passed through a column of ion exchange material in the chloride form (Dowex 2) which removed the product and permitted its separation from any unchanged galactose. The galactonic acid product was eluted from the column with 0.12 M hydrochloric acid, which was subsequently removed by evaporation under reduced pressure.

In summary, the instant invention provides a novel galactose oxidase of high specificity and a method for its preparation. This oxidase is useful for the qaulitative detection and the quantitative determination of galactose in a wide variety of substances. It can also be used for the removal of galactose from many substances. An easy and convenient method for the detection of galactosemia is now feasible by use of a composition which contains the instant novel enzyme.

Having thus fully described and illustrated the character of the instant invention, what is desired protected by Letters Patent is:

1. A non-viable preparation which catalyzes the oxidation of galactose by molecular oxygen with high specificity, and which has no appreciable effect on the oxidation of glucose by molecular oxygen, comprising a concentrated dialysate extracted from *Polyporus circinatus* Fr. and possessing galactose oxidase activity.

2. A composition for detecting galactose in the presence of glucose, and which is insensitive to glucose, comprising galactose oxidase, peroxidase, and a compound which changes color when oxidized by hydrogen peroxide.

3. The composition of claim 2, wherein the color-changing compound is o-tolidine.

4. The composition of claim 2, wherein the color-changing compound is o-dianisidine.

5. A test indicator for detecting galactose even in the presence of glucose, comprising a water-absorbing material containing the composition defined in claim 17.

6. A composition which catalyzes with high specificity the oxidation of galactose by molecular oxygen to galactonic acid, without appreciable effect on other sugars, comprising a synergistic mixture of galactose oxidase with a minor proportion of flavin mononucleotide.

7. A method for removing galactose from a substance containing it, without destroying any glucose therein, which comprises admixing said substance in the presence of water and molecular oxygen with a non-viable enzyme system having catalase and galactose oxidase activity, and maintaining the admixture at a pH between about 6.5 and about 7.5 and at a temperature between about room temperature and about 60° C. until the galactose is converted into galactonic acid.

8. The method recited in claim 7 wherein said substance is milk and said enzyme system also has lactose splitting activity.

9. The method of claim 7, wherein said substance is a food.

10. A method for the preparation of galactose oxidase which comprises growing cultures of *Polyporus circinatus* Fr. at about room temperature in an aqueous medium containing galactose and a source of nitrogen and having a pH of about 6.8, harvesting the enzyme produced, and purifying the harvested enzyme.

11. The method of claim 10, wherein each two liters of the medium consists essentially of: about 30 gms. galactose, about 33 gms. monobasic potassium phosphate, about 3.2 gms. dibasic sodium phosphate, about 4 gms. ammonium sulfate, about 2 gms. ammonium nitrate, about 1 gm. each of sodium chloride and magnesium sulfate, about 3 gms. potassium chloride, about 0.2 gm. calcium chloride, about 1.7 mg. each of zinc sulfuate and sodium molybdate, about 0.3 mg. cuprous chloride, about 3.6 mg. ferric nitrate, and about 1.3 mg. manganese sulfate.

12. A method for producing galactonic acid free of gluconic acid, which comprises incubating a galactose-containing solution with a non-viable enzyme preparation having galactose oxidase activity and devoid of glucose oxidase activity, introducing molecular oxygen into the resulting mixture, and separating galactonic acid from the reaction products.

13. The method of destroying free oxygen dissolved in a material which contains galactose, which comprises adding to said material a non-viable enzyme system having catalase and galactose oxidase activity, and maintaining said material below 60° C. until said oxygen is consumed.

References Cited in the file of this patent

UNITED STATES PATENTS

| 2,744,017 | Baldwin | May 1, 1956 |
| 2,758,934 | Scott | Aug. 14, 1956 |
| 2,848,308 | Free | Aug. 19, 1958 |
| 2,893,843 | Adams | July 7, 1959 |
| 2,893,844 | Cook | July 7, 1959 |
| 2,912,309 | Free | Nov. 10, 1959 |

FOREIGN PATENTS

| 203,451 | Australia | July 5, 1955 |

OTHER REFERENCES

Masuo et al.: Chemical Abstracts, vol. 51, 5192(f), (1957).

Proc. of The Int. Symposium on Enzyme Chemistry, Tokyo and Kyoto, 1957, published 1958 by Maruzen, Tokyo article by Underkofler, pp. 486 to 490 (Glucose Oxidase).

UNITED STATES PATENT OFFICE
CERTIFICATE OF CORRECTION

Patent No. 3,005,714　　　　　　　　　　　　　　October 24, 1961

John A. D. Cooper

It is hereby certified that error appears in the above numbered patent requiring correction and that the said Letters Patent should read as corrected below.

Column 7, line 69, for the claim reference numeral "17" read -- 2 --.

Signed and sealed this 3rd day of April 1962.

(SEAL)
Attest:

ERNEST W. SWIDER
Attesting Officer

DAVID L. LADD
Commissioner of Patents